INVENTORS.
MARTIN HESS.
GEORGE E. JONES, JR
BY
their ATTORNEY

INVENTORS
MARTIN HESS,
GEORGE E. JONES, JR.
BY
their
ATTORNEY

United States Patent Office 3,119,772
Patented Jan. 28, 1964

3,119,772
PROCESS AND APPARATUS FOR SEPARATING WATER FROM AN AQUEOUS SYSTEM
Martin Hess, Pittsburgh, and George E. Jones, Jr., Export, Pa., assignors to Koppers Company, Inc., a corporation of Delaware
Filed May 12, 1960, Ser. No. 28,736
15 Claims. (Cl. 210—60)

This invention relates to a chemical method and apparatus for separating water from aqueous saline solutions and more particularly to an improved hydrate forming method and apparatus for separating water from aqueous saline solutions.

Many processes have been used to separate fresh or potable water from salt water but it has been a problem to accomplish the separation effectively on a large scale and at a cost cheap enough to substitute for or augment water from conventional sources.

Three such systems have been the distillation system, the ice forming system, and the hydrate forming system, all of which have been operated on the principle that fresh water has been separated at one temperature and recovered at another temperature.

Distillation has been perhaps the oldest and most widely used system but scale formation has been a problem; also fuel and equipment requirements have been serious drawbacks. Improvements have been made in the distillation system by using cheap power, such as solar energy, but the equipment costs have remained high. As an illustration, it has been estimated that to supply fresh water from salt water to a city the size of Los Angeles, it would require solar collectors having an area of about 250 square miles. Moreover, there have been many locations with small amounts of available solar energy, such that the area of the collectors would have to be even greater.

The freezing and hydrate methods have been advantageous over the distillation methods because the latent heat requirements have been reduced about seven fold from that necessary for distillation. Additionally the hydrate forming method, such as disclosed in United States Patent 2,904,511 by Wilm E. Donath, issued September 15, 1959, has been advantageous over the freezing method because the hydrate forming method has been operable at higher temperatures than the freezing method. FIG. 3 shows that the hydrate process has been operable theoretically at a 5.7° C. advantage over the freezing process with a resulting increase in refrigeration efficency and less heat transfer equipment.

In the heating and cooling steps for separating water from brine by the use of the known hydrates, costs have been unavoidably encountered which have rendered the process except perhaps in most favorable circumstances non-competitive with other water recovery processes. Washing steps for separation of product water have encountered contamination problems and these have also added to the cost of operating hydrate process.

It is an object of this invention, therefore, to provide an improved hydrate forming apparatus and method that overcomes the above mentioned disadvantages and is commercially feasible for making fresh water from saline solutions.

In accordance with this invention, it has been found that when a liquid hydrate forming substance is brought into direct contact with an aqueous system such as sea water, for example, and the mixture is at a temperature which is above the hydrate forming temperature and at a pressure which will enable the formation of hydrate yet which is below the vapor pressure of the hydrate forming substance, the liquid hydrate forming substance will, in part, evaporate and remove heat from the mixture lowering the temperature thereof below the hydrate forming temperature thereby enabling the formation of solid hydrate. As long as the pressure is maintained as described above, the liquid hydrate forming substance will continue to evaporate maintaining the temperature of the mixture below the hydrate forming temperature in spite of heat gains by the mixture such as the heat generated during hydrate formation. The vaporized hydrate forming substance must, of course, be removed in order to maintain these pressure conditions. In order to reduce the operational energy demands of the system the gaseous hydrate forming substance so removed is brought into direct contact with the solid hydrate at some point out of the hydrate forming zone at a pressure greater than the vapor pressure of the hydrate forming substance where the gaseous forming hydrate substance gives up its heat to the solid hydrate thereby decomposing the hydrate and liquefying the hydrate forming substance. The hydrate forming substance so liquefied may then be recycled together with the hydrate forming substance produced in the decomposition step to the hydrate forming zone while the water resulting from the hydrate decomposition may be removed as product. The above has been accomplished in accordance with this invention with the added advantage of reacting hydrate forming substance more effectively with the salt water to form solid hydrate. As will be understood more fully from the following, this is because the rate of hydrate formation depends on the amount of hydrate forming substance dissolved in the salt water, and it has been found that more hydrate forming substance is dissolved in the salt water when the forming substance is in a liquid phase than when the hydrate forming substance is in a gaseous phase.

This invention also contemplates a method and apparatus for separating water from aqueous saline solutions in which the aqueous saline solution is mixed directly with a liquid phase hydrate forming substance, the liquid phase hydrate forming substance evaporating to cool the aqueous saline solution and reacting therewith to form a solid hydrate, removing the solid hydrate formed, washing aqueous saline solutions from said solid hydrate without contaminating substantially all of the wash water used, and melting the solid hydrate by mixing the solid hydrate directly with hydrate forming substance evaporated in the forming step.

The hydrate forming substances contemplated within this invention are those hydrate forming substances which form hydrates below the critical temperature of the hydrate forming substance, the critical temperature being the temperature below which a substance may exist simultaneously as a liquid and a vapor.

In one embodiment this invention comprises pre-mixing aqueous saline solution directly with liquid phase propane, introducing the mixture to a first zone at a temperature which is above the hydrate forming temperature and at a pressure which will enable the formation of hydrate yet which is below the vapor pressure of the hydrate forming substance, whereby a portion of the propane evaporates to cool the mixture to a temperature below the hydrate forming temperature, whereby some of the propane reacts with the saline solution to form a solid hydrate and, removing the vaporized propane to maintain the mixture at a pressure enabling the formation of hydrate yet below the vapor pressure of propane, whereby propane continues to evaporate to cool the mixture below the hydrate forming temperature and remove the heat from the formation reaction, separating the solid hydrate generated during the mentioned first zone, washing salt water from the solid hydrate removed from the first zone by counterflowing the solid hydrate with fresh water thereby displacing the salt water around and adhering to the solid hydrate, contacting the gaseous propane continuously removed from said first zone phase directly with the washed solid hydrate under pressure in excess of the vapor pressure of propane to liquefy the propane and to melt the solid hydrate into salt free water and propane, recycling the cooled propane (liquid) to the first zone, and removing dissolved propane from the salt free water to form purified water using part of the salt free water from the melted hydrate in the washing of the solid hydrate.

Figure 1:
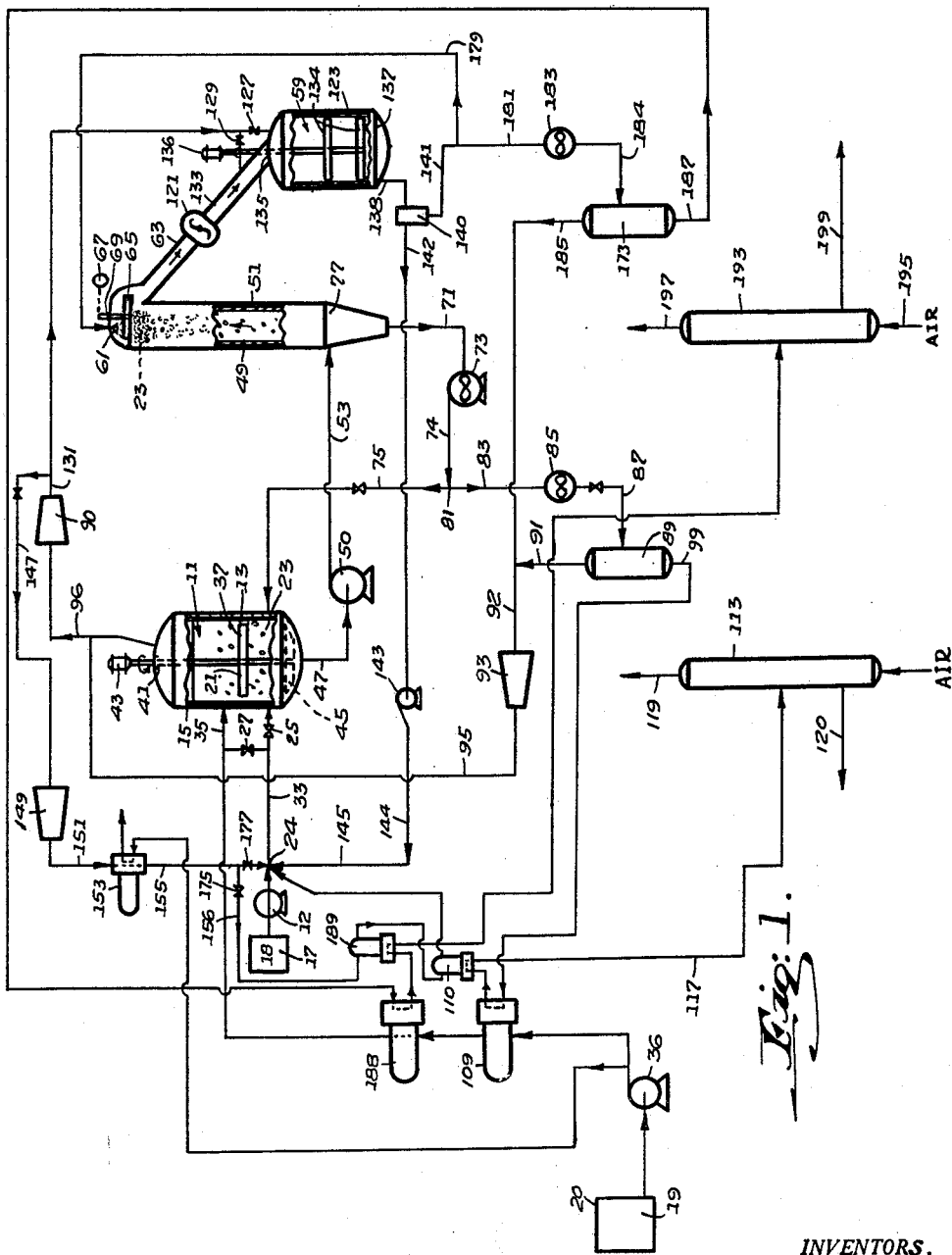
FIG. 1 is a schematic diagram of an embodiment of this invention in which some elements are shown in cross section.

Referring to FIG. 1, the system and apparatus of this invention includes a hydrate forming zone 11 formed by a hydrate forming vessel 13 capable of being pressurized by hydrate former pump 12 to a pressure necessary for the formation of solid hydrate therein yet below the vapor pressure of propane and having an insulation 15 on the outside thereof to reduce the transfer of heat between zone 11 and the atmosphere around vessel 13. Liquid phase hydrate forming material 17, advantageously propane 17 from make-up tank 18, and aqueous saline solution 19 from tank 20 or other source, such as sea water, are thoroughly mixed into a mixture that is maintained in agitation in vessel 13. In the absence of the cooling action brought about by the evaporation of propane the temperature within the vessel 13 would initially be above the hydrate forming temperature. Therefore, upon evaporation of a portion of the liquid propane cooling of the mixture to below the hydrate forming temperature occurs so that a solid hydrate 23 is formed in vessel 13. Continuous removal of the gaseous propane from above the surface of the mixture in vessel 13 via pipe 96 and compressor 90 insures maintenance of pressure conditions encourging the continuous evaporation of liquid propane in quantities sufficient to maintain the temperature below the hydrate forming temperature in spite of the addition of heat to the mixture as from the heat of formation of the solid hydrate. In the preferred embodiment tank 18 is connected to a fitting 24 that is connected to feed propane 17 pre-mixed with salt solution 19 to vessel 13. To this end valve 25 is closed and valve 27 is open so that liquid propane 17 from fitting 24 flows through pipe 33 to salt solution pipe 35 adjacent vessel 13 where the two materials 17 and 19 are intimately mixed under pressure maintained by propane pump 12 and salt water pump 36 in the space provided by pipe 35 just prior to entry of the mixture into vessel 13 from pipe 35. The propane 17 and solution 19 enter vessel 13 adjacent paddle 37. The paddle 37 has a shaft that is rotatable in vessel 13 through packing 41 by means of motor 43 so as to maintain the mixture at a high level of agitation and to insure maximum dispersion of the mixture in vessel 13. The described mixing and agitation achieve maximum heat transfer between the propane 17 and saline solution 19. As described above some liquid phase propane 17 evaporates in vessel 13 cooling the saline solution 19 while additional of the liquid propane reacts with solution 19 to form the solid hydrate 23 in vessel 13. The direct contact of the hydrate former 17 and saline solution 19 eliminates the need for indirect cooling of the contents of vessel 13. It is understood, of course, that opening valve 25 and closing valve 27 causes the liquid propane 17 and solution 19 to enter vessel 13 separately adjacent paddle 37 and paddle 45 which is also driven by motor 43.

The solid hydrate 23 is removed from vessel 13 with aqueous saline solution (brine) as a slurry through pipe 47 to washing column 49 maintained by means of pump 50 substantially at the hydrate forming pressure in formation vessel 13. In the washing column 49 having an outside insulation 51 the hydrate is separated from the brine. Advantageously, the solid hydrate is introduced into the washing column 49, washed and removed in a continuous operation. To this end pump 50 feeds the slurry from pipe 47 to a pipe 53 that conducts the slurry to washing column 49 where the solid hydrate floats upwardly and concentrates as a compact mass at the top of the column. Meanwhile fresh water, advantageously melted from solid hydrate in a decomposition zone 59 as described in more detail hereinafter, flows downwardly substantially in a plug type flow from nozzle 61 at the top of the column 49. For this purpose the fresh water from nozzle 61 flows through the compact bed of hydrate crystals and counter to the rising hydrate crystals in column 49 so that the fresh water displaces the saline solution deposited on and in between the surfaces of the hydrate crystals as the crystals rise in the column 49 and only small amounts of fresh water added from nozzle 61, as low as about 1%, mixes with the salt water. Then the hydrate crystals 23, with fresh water adhering thereto are scraped into channel 63 from the top of the column 49 by rotatable scraper 65 having a shaft that is rotatable by means of motor 67 through packing 69.

Cool saline solution free of hydrate crystals is removed from the bottom of column 49 through pipe 71 and part of the saline solution is recycled to the forming vessel 13 by means of pump 73 connected to pipes 71, 74, and 75. Screen 77 in the bottom of column 49 keeps solid hydrate from entering pipe 71. The rest of the saline solution from pipe 71 is divided at T 81 and passes from there through pipe 83, pump 85, and line 87 to standard flash chamber 89. Propane leaves the brine in flash chamber 89 and is conducted back to a primary compressor 90 by way of pipes 91 and 92, recycle compressor 93, pipe 95, and pipe 96. Brine leaves flash chamber 89 by means of pipe 99 and travels to heat exchanger 109 to cool incoming salt water 19. Thereupon the brine passes through heat exchanger 110 to cool recycle propane from compressor 90, described in more detail hereinafter, and brine leaving heat exchanger 110 flows to aeration tower 113 through pipe 117. The temperature of the brine entering the aeration tower 113 is thus increased sufficiently such that air and propane from the brine leave aeration tower 113 through pipe 119. The mixture in pipe 119 is burned to generate power used to operate any of the mentioned pumps. Meanwhile spent brine leaves aeration tower 113 and passes to drain through pipe 120.

The solid salt free hydrate in channel 63 is transferred to hydrate decomposition zone 59. To this end the solid hydrate and water in the top of channel 63 falls into standard pressure lock 121, such as a standard star feeder, screw, or slurry pump. The pressure lock 121 in turn is connected to vessel 123. Evaporated hydrate forming substance from vessel 13 is used to melt the solid hydrate coming from pressure lock 121 to vessel 123. To this end advantageously valve 127 is closed and valve 129 is open and gaseous propane from vessel 13 passes through pipe 96 to compressor 90, and thence through pipe 131, valve 129, and channel 133 to vessel 123. Meanwhile, paddles 134 in vessel 123 are rotatable in packing 135 in the top of vessel 123 by means of motor 136 to keep the contents of vessel 123 agitated thereby to insure maximum heat transfer of the contents of vessel 123.

Liquid propane and melted hydrate in the form of salt free water passes out of the bottom of vessel 123 through out of vessel 123. As a result, salt free water goes to a screen 137 and pipe 138 and flows to decanting vessel 140. The screen 137 prevents solid hydrate from flowing the bottom of decanter 140 from whence it is removed by pipe 141 and condensed hydrate forming substance decants upwardly in vessel 140 and leaves therefrom by means of pipe 142 from whence the hydrate forming substance passes through pump 143, pipe 144, and pipe 145 to fitting 24 and thence is recycled as a liquid to vessel 13.

Salt free water from decanter 140 passes through pipe 141 and part passes to pipe 179 and thence to nozzle 61 for washing of solid hydrate in washer 49. The rest and major part of the salt free water from decanter 140 passes from pipe 141 through pipe 181, pump 183, pipe 184, and standard flash chamber 173. Almost all of the propane dissolved therein flashes from the water in chamber 173 and passes through pipe 185, compressor 93, pipe 95, pipe 96 to compressor 90. Meanwhile, cool salt free water passes out of the bottom of flash chamber 173, flows through pipe 187, passes through heat exchanger 188 where the salt free water takes up heat from incoming salt water 19, and passes through heat exchanger 189 where the salt free water takes up more heat from propane recycled from compressor 90 to vessel 13 as described below and then the salt free water enters the bottom of aerator 193.

The water thus warmed in heat exchangers 188 and 189 gives up propane in aerator 193. Air introduced in the bottom of the aerator 193 from pipe 195 mixes with propane from the water therein and leaves the aerator from pipe 197. Thereafter the propane and air are burned for power used such as for powering the mentioned compressors. Thereupon, purified water leaves aerator 193 through pipe 199.

As described above, part of the propane in vessel 13 forms solid hydrate and part of the propane in vessel 13 evaporates. Part of the evaporated propane is used in decomposition zone 59 to melt solid hydrate. The evaporated propane from vessel 13 passes through pipe 96, compressor 90, and pipe 131. Part of the propane from pipe 131 passes through pipe 147, auxiliary compressor 149, pipe 151, heat exchanger 153, where the propane is cooled by means of salt water 19 from pump 36. Thereupon the propane from exchanger 153 passes through from pipe 155, pipe 156 and heat exchanger 189, where the propane is further cooled by salt free water from decanter 140 and flash chamber 173. Then the propane passes through heat exchanger 110 where the propane is still further cooled by brine from washer 49 and flash chamber 89; and from there the propane passes to fitting 24 in liquid phase for recycling to vessel 13. Alternately by closing valve 175 and opening valve 177, the recycle propane from compressor 90 will be cooled only by incoming salt water such as sea water from pump 36.

In operation, pump 36 transports saline water 19 to be purified through heat exchangers 109 and 188 to pipe 35 and to hydrate forming vessel 13. The heat exchangers cool the saline water almost to hydrate forming temperature. Liquid make-up hydrate forming material 17, advantageously propane, enters pipe 33 under pressure. The liquid phase propane enters saline solution pipe 35 from valve 27 connected between propane feed pipe 33 and salt water pipe 35 close to vessel 13. The residence time of the mixture of propane and salt water in pipe 35 is short enough so that solid hydrate does not form in pipe 35 but long enough to start mixing the propane 17 and salt water 19 and to further cool the salt water in pipe 35. From pipe 35 the mixture enters vessel 13 which is maintained at a pressure to enable solid hydrate to be formed therein. The liquid propane evaporates in vessel 13 while the contents of vessel 13 are agitated by rotation of impeller 37. Thus the propane in vessel 13 removes sufficient sensible heat from the incoming salt water 19 to reduce the temperature of the salt water 19 to hydrate forming temperature; removes heat liberated by the hydrate forming reaction which is exothermic; removes sensible heat in the recycle brine solution entering vessel 13 from washer 49 by way of lines 71, 74, and 75, thus to reduce the recycle brine temperature to hydrate forming temperature; removes heat gained in the hydrate forming vessel or system by way of vessel 13, transport line walls and by way of transport pumps such as pump 73 and reacts with the saline water and recycle brine to form solid hydrate, thus using the hydrate forming substance both as a reactant and as a refrigerant. Moreover, since the rate of hydrate formation is dependent on the amount of propane forming substance dissolved in the salt water and since the described method and apparatus dissolve the propane in the salt water to a greater degree than was possible heretofore, the method and apparatus of this invention result in improved and more efficient hydrate formation.

It should be clear from the preceding description that an excess of liquid hydrate forming substance over and above the amount necessary for the formation of hydrate is always present in the hydrate forming zone and while one part of the propane in vessel 13 directly contacts incoming salt water and forms solid hydrate, the second part of the propane therein dissolves in the salt water in vessel 13 and the rest or third part therein is evaporated in vessel 13. The first part of the propane is removed from the solid hydrate. Part of this propane is recycled back to vessel 13 as a liquid and part dissolves in the water formed from the solid hydrate whereupon substantially most of the propane dissolved in the water is removed from the water and recycled back to be added to the evaporated propane leaving vessel 13 on its way to compressor 90. The third part of the propane is divided into a primary part and a secondary part in decomposition zone 59. The primary part decomposes the solid hydrate by direct contact therewith, condenses into liquid, and mixes with the mentioned first part of the propane. The secondary part is condensed and recycled back to be added to the evaporated propane leaving vessel 13 on its way to compressor 90. Thus only small amounts of make-up propane are required, the amounts required being the small amount removed from aerators 113 and 193.

The washing of the solid propane in vessel 49 is accomplished continuously by counter current washing with fresh water to remove the saline water adhering to and around the solid hydrate removed from vessel 13 so as to displace the salt water with fresh water. The fresh water introduced into column 49 for this purpose comes from melted hydrate in zone 59. Only small amounts of fresh water from melted hydrate are used to wash the solid hydrate taken from former 13.

It is understood of course that washer 49 is operable as a plug type batch washer in which case the column is filled at the bottom with the slurry from vessel 13 so that solid hydrate moves upwardly in the column. After the vessel has been thus charged with the slurry from the bottom of the vessel 49, fresh water from nozzle 61 is forced downwardly and salt water is removed from the bottom of the washer 49 so as to maintain an interface between the fresh water moving downwardly and the salt water adhering to and around the solid hydrate thus to displace the salt water with fresh water. In this method of operation, as little as 1% of the fresh water mixes with the salt water and the solid hydrate with fresh water adhering thereto is scraped from the top of the column 49 into channel 63.

Figure 2:
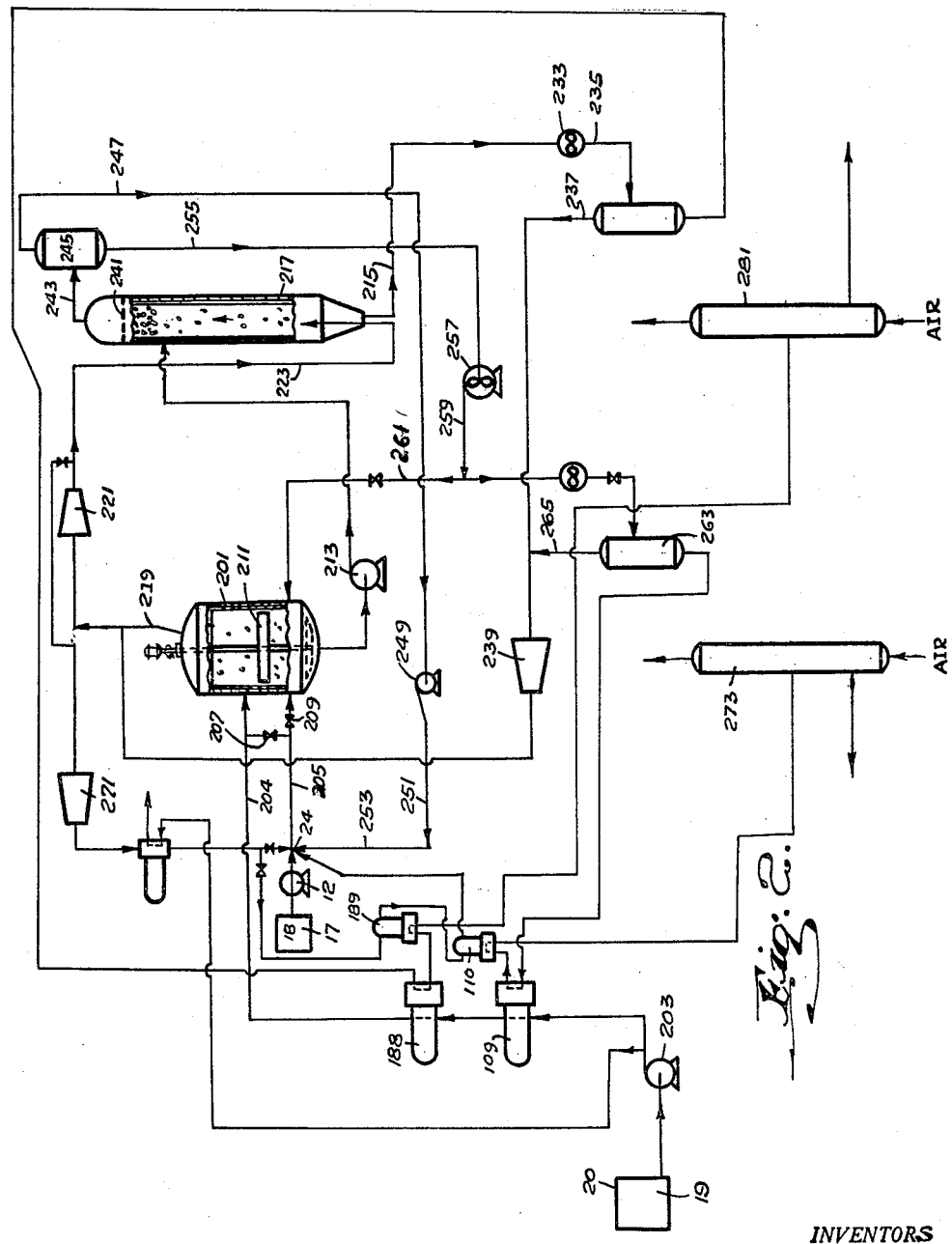
FIG. 2 is a schematic diagram of another embodiment of the invention of FIG. 1 in which some elements are shown in partial cross section.
Figure 3:
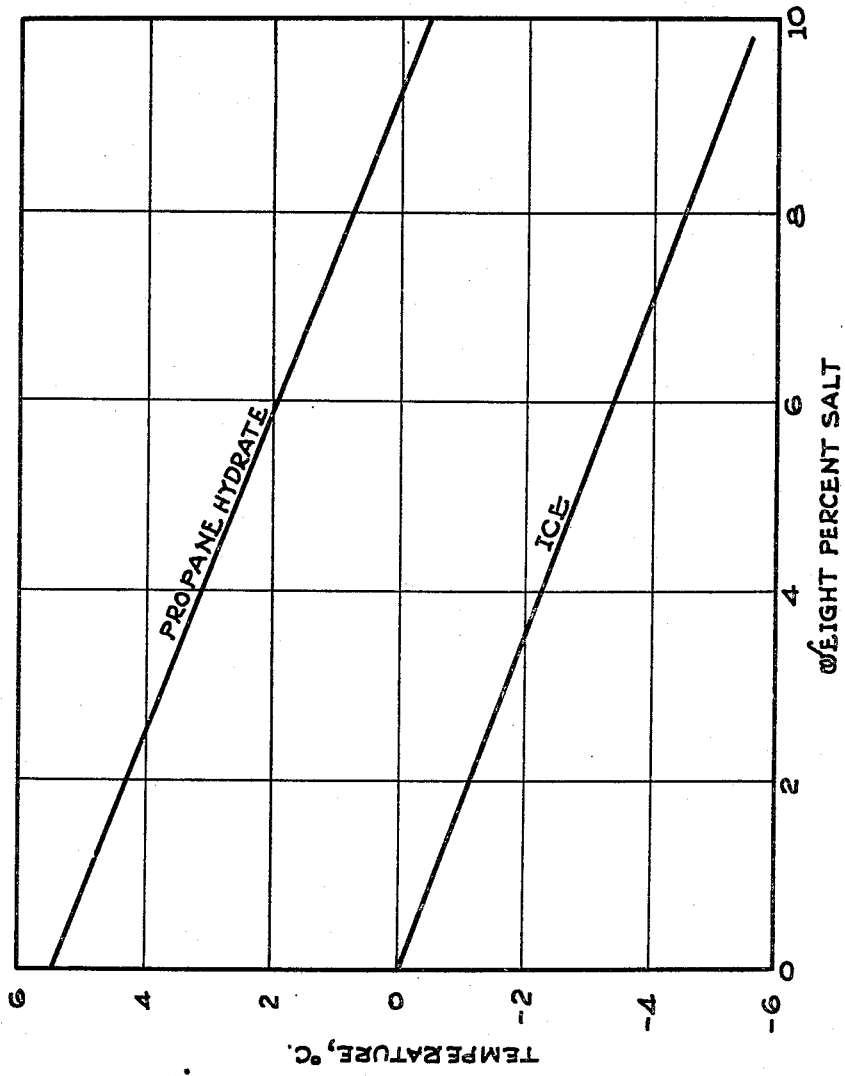
FIG. 3 is a graph comparing temperatures of ice forming and hydrate forming.

In another embodiment of this invention (FIG. 2) solid hydrate is formed in a first step and then washed and decomposed in a second step. The hydrate forming substance is the same as described above and includes the hydrate formers contemplated by the Donath patent mentioned above. Advantageously, the hydrate former is propane.

In this embodiment solid hydrate is formed in hydrate former 201. To this end pump 203 flows salt water into vessel 201 through pipe 204. Make-up liquid propane from a suitable source (not shown), flows through pipe 205 and valve 207 into vessel 201, valve 209 being closed. Agitator 211 maintains the contents of vessel 201 in a high state of agitation. The liquid propane cools the salt water to hydrate forming temperature and reacts therewith to form a solid hydrate.

Pump 213 removes solid hydrate and salt water from vessel 201 as a slurry and transports the slurry through pipe 215 to washer-decomposer column 217 where the solid hydrate separates from the brine in the slurry. To this end the slurry enters the upper region of column 217 and the solid hydrate descends in the column 217. Gaseous propane evaporated in the former 201 enters the bottom of the column 217 and ascends upwardly therein. For this purpose vessel 201 is connected to column 217 by line 219, compressor 221, and line 223. The gaseous propane entering column 217 from line 223 loses heat to the solid hydrate so as to decompose the solid hydrate as it moves downwardly in column 217 and condenses the gaseous propane into a liquid that is immiscible with the water formed by decomposition of the solid hydrate. The major part, about 90%, of the water from the melted hydrate is withdrawn as a liquid through product line 215. This water withdrawn through line 215 passes through pump 233 and line 235 to standard flash chamber 237 whereupon propane flashes out of the water and returns to column 217 through line 237 and compressor 239 and compressor 221. Meanwhile, the propane from line 223 percolates upwardly through the descending bed of solid hydrate and simultaneously displaces (washes) the salt water entrained with the solid hydrate. The salt water thus displaced and slightly diluted flows upwardly through filter screen 241 and is withdrawn with condensed propane through pipe 243 that is connected to decanter 245.

The liquid propane and salt water are separated in decanter 245. To this end the liquid propane being lighter than the salt water floats on top of the salt water and leaves the decanter 245 through line 247 and returns by means of pump 249, lines 251 and 253 to line 205 and vessel 201. Meanwhile, brine from the bottom of decanter 245 returns by means of line 255, pump 257, line 259, and line 261 to vessel 201.

As in the preferred embodiment described above, part of the salt water separated from the propane in the decanter passes to a standard flash chamber, such as flash chamber 263. Therein propane flashes from the salt water and returns to compresser 221 by way of line 265 and compresser 239. Thereafter spent brine from flash chamber 263 cools the salt water to be treated in the hydrate formation vessel and also cools propane evaporated from the formation vessel that is recycled to the formation vessel 201 as a liquid through compresser 271. Then, as described above, the spent brine passes through an aerator, such as aerator 273. Also, as in the preferred embodiment described above, propane flashes from the salt free water in flash chamber 237 and returns to a compresser 221 by way of a compresser, such as compresser 239, and salt free water from flash chamber 237 cools the salt water to be treated in the hydrate formation vessel and also cools propane evaporated from the formation vessel that is recycled to the formation vessel as a liquid through compresser 271. Then, as described above, the salt free water passes through aerator 281.

It is understood that the hydrate forming materials of this invention such as disclosed in Donath, supra, are gaseous at room temperature and pressure but in accordance with this invention the hydrate forming materials may also be liquid at room temperature and atmospheric pressure.

The described apparatus and method directly contact liquid phase hydrate forming material such as propane with salt water to form a solid hydrate and to condense the hydrate forming substance. Also the described apparatus and method directly contact the evaporated hydrate forming substance in gaseous phase with the formed solid hydrate to decompose the solid hydrate and to condense the hydrate forming substance for recycle back to the formation step and apparatus. The described method and apparatus also displaces salt water from the solid hydrate with fresh water by controlled counter flow so as not to contaminate substantially all of the fresh water used therefor. Thus the apparatus and method of this invention effectively and efficiently produce fresh water from salt water in a system that is new and improved over the systems known heretofore.

What is claimed is:

1. A method of separating water from an aqueous system comprising directly contacting the aqueous system with a hydrate forming substance in the liquid state, the resulting medium initially being at a temperature above the hydrate forming temperature, maintaining the pressure on the medium at some hydrate forming pressure below the vapor pressure of said hydrate forming substance whereby liquid hydrate forming substance continuously evaporates to cool the medium lowering the temperature thereof below the hydrate forming temperature to enable formation of solid hydrate, agitating the medium to thoroughly mix the liquid hydrate forming substance and the aqueous system thereby achieving maximum heat transfer therebetween, removing from the medium solid hydrate formed therein, displacing from the removed solid hydrate substantially all aqueous system entrained therewith, directly contacting the cleaned solid hydrate at a pressure in excess of the vapor pressure of said hydrate forming substance with gaseous hydrate forming substance removed from above the medium thereby decomposing the solid hydrate and condensing the gaseous hydrate forming substance, removing the water produced, separately removing the liquid hydrate forming substance produced, and recirculating the liquid hydrate forming substance into direct contact with more of the aqueous system.

2. The invention of claim 1 in which said hydrate forming substance is propane and the aqueous system is sea water.

3. A method of separating water from an aqueous system comprising directly adding a hydrate forming substance in the liquid state to the aqueous system with the combined materials initially being at a temperature above the hydrate forming temperature, maintaining the pressure on the combined materials at some hydrate forming pressure below the vapor pressure of said hydrate forming substance whereby liquid hydrate forming substance continuously evaporates to cool the combined materials lowering the temperature thereof below the hydrate forming temperature to enable formation of the solid hydrate, said hydrate forming substance being a gas at room temperature and pressure and being capable of forming a hydrate below its critical temperature, agitating these combined materials to thoroughly commingle the liquid hydrate forming substance and aqueous system thereby achieving maximum heat transfer therebetween, removing from the commingled materials the solid hydrate crystals formed, displacing the aqueous system entrained with the removed solid hydrate crystals to form clean solid hydrate crystals, directly contacting the cleaned solid hydrate crystals at a pressure in excess of the vapor pressure of said hydrate forming substance with gaseous hydrate forming substance removed from above the combined materials to decompose the solid hydrate crystals and condense the gaseous hydrate forming substance, removing the water produced during the decomposition step, separately removing the liquid hydrate forming substance resulting from condensation and crystal decomposition, and recirculating the liquid hydrate forming substance into direct contact with more of the aqueous system.

4. A method of separating water from material mixed therein comprising directly contacting an aqueous mixture with a hydrate forming substance in the liquid state with the resulting medium initially being at a temperature above the hydrate forming temperature, said hydrate forming substance being a gas at room temperature and pressure and being capable of forming a hydrate below its critical temperature, maintaining the pressure on the medium at some hydrate forming pressure below the vapor pressure of said hydrate forming substance whereby liquid hydrate forming substance continuously evaporates to cool the medium lowering the temperature thereof below the hydrate forming temperature to enable formation of the solid hydrate, agitating this medium to thoroughly commingle the liquid hydrate forming substance and the aqueous mixture to achieve maximum heat transfer therebetween and to form solid hydrate crystals, removing from the medium the hydrate crystals formed therein, displacing substantially all the aqueous mixture entrained with the removed hydrate crystals, directly contacting the hydrate crystals at a pressure in excess of the vapor pressure of said hydrate forming substance with a portion of the gaseous hydrate forming substance removed from above the medium to decompose the crystals to form water and hydrate forming substance in liquid form, removing the water produced from decomposition of the hydrate crystals, separately removing liquid hydrate forming substance produced, and recirculating this liquid hydrate forming substance into direct contact with more of the aqueous mixture.

5. A method of separating water from material mixed therein comprising directly adding a hydrate forming material in the liquid state to the aqueous mixture with the resulting medium initially being at a temperature above the hydrate forming temperature, said hydrate forming material being a gas at room temperature and atmospheric pressure and being capable of forming a hydrate below its critical temperature, maintaining the pressure on the medium at some hydrate forming pressure below the vapor pressure of said hydrate forming substance whereby liquid hydrate forming substance continuously evaporates to cool the medium lowering the temperature thereof below the hydrate forming temperature to enable formation of the solid hydrate agitating the medium to thoroughly commingle the liquid hydrate forming material and the aqueous mixture to achieve maximum heat transfer therebetween, removing from the commingled materials the hydrate crystals formed along with some entrained aqueous mixture, displacing the aqueous mixture entrained with the removed hydrate crystals, directly contacting the hydrate crystals at a pressure in excess of the vapor pressure of said hydrate forming substance with a portion of the gaseous hydrate forming material removed from above the medium to decompose the hydrate crystals, removing the water produced during decomposition of the hydrate crystals, separately removing liquid hydrate forming material produced, and recirculating this liquid hydrate forming material into direct contact with more of the aqueous mixture.

6. A method for producing potable water from an aqueous salt solution, comprising directly contacting the aqueous salt solution with a liquid hydrate forming substance, conducting the salt solution and the hydrate forming substance as a mixture to a hydrate forming zone at a temperature above the hydrate forming temperature, said liquid hydrate forming substance dispersing through said salt solution with a first portion of the liquid hydrate forming substance evaporating to cool said solution in said hydrate forming zone and a second portion thereof combining with water from the aqueous salt solution to form solid hydrate and brine, continuously removing evaporated hydrate forming substance from said hydrate forming zone, separating the solid hydrate from the brine, subjecting the solid hydrate so separated to direct contact with a portion of the removed gaseous hydrate forming substance in a hydrate decomposing zone, recovering potable water from said decomposing zone, and recycling liquefied hydrate forming substance from said decomposing zone to said hydrate forming zone.

7. The invention recited in claim 6 in which the hydrate forming substance is propane and the aqueous salt solution is sea water.

8. A method for producing potable water from an aqueous salt solution, comprising intermixing the aqueous salt solution with a liquid hydrate forming substance in a first zone at a temperature above the hydrate forming temperature, the liquid hydrate forming substance dispersing uniformly through the salt solution with a first portion of the liquid hydrate forming substance evaporating to cool the salt solution and a second portion of the liquid hydrate forming substance combining with water from the aqueous salt solution to form solid hydrate and brine in said first zone, continuously removing evaporated hydrate forming substance from said first zone, removing solid hydrate and brine as a slurry from said first zone and passing the solid hydrate and brine into a second zone, said solid hydrate floating upwardly to concentrate in said second zone, transporting solid hydrate from the top of said second zone into a third zone, contacting the solid hydrate in said third zone with gaseous hydrate forming substance removed from said first zone thereby condensing the gaseous hydrate forming substance and decomposing the solid hydrate to yield salt-free water and hydrate forming substance, recycling the condensed hydrate forming substance to said first zone, recovering the salt-free water and diverting a portion thereof to flow downwardly from the top of said second zone through the concentrated solid hydrate adjacent thereto in counter-flowing fashion so that the solid hydrate taken from the top of said second zone is substantially free of aqueous salt solution.

9. The invention recited in claim 8 in which the hydrate forming substance is propane and the aqueous salt solution is sea water.

10. Apparatus for separating water from an aqueous system comprising means for containing under pressure a mixture of aqueous system and a liquid hydrate forming substance, means connected to said containing means for continuously withdrawing therefrom gaseous hydrate forming substance accumulating therein, means for removing therefrom solid hydrate formed in said containing means, and means for directly contacting the solid hydrate so removed with gaseous hydrate forming substance withdrawn from said containing means.

11. A method for separating water from an aqueous system comprising directly contacting the aqueous system with a hydrate forming substance in the liquid state, maintaining the pressure on the aqueous system at hydrate forming pressure and also below the vapor pressure of said hydrate forming substance whereby liquid hydrate forming substance continuously evaporates to cool the aqueous system lowering the temperature thereof below the hydrate forming temperature and enabling the formation of solid hydrate, removing from the aqueous system solid hydrate formed therein and directly contacting the solid hydrate so removed with gaseous hydrate forming substance withdrawn from over the aqueous system.

12. The invention recited in claim 11 in which the hydrate forming substance is propane and the aqueous system is sea water.

13. A method for separating water from an aqueous system comprising directly contacting the aqueous system with a hydrate forming substance in the liquid state, the resulting medium initially being at a temperature above the hydrate forming temperature, maintaining the pressure on the medium at hydrate forming pressure and also below the vapor pressure of said hydrate forming substance whereby liquid hydrate forming substance continuously evaporates to cool the medium lowering the temperature thereof below the hydrate forming temperature, and removing from the medium solid hydrate formed therein, and enabling the continuous formation therein of solid hydrate.

14. The invention recited in claim 13 in which the hydrate forming substance is propane and the aqueous system is sea water.

15. A method for separating water from an aqueous system comprising directly contacting the aqueous system with a hydrate forming substance in the liquid state, maintaining the pressure on the aqueous system at hydrate forming pressure and also below the vapor pressure of said hydrate forming substance and removing from the aqueous system solid hydrate formed therein whereby liquid hydrate forming substance continuously evaporates to cool the aqueous system lowering the temperature thereof below the hydrate forming temperature and enabling the continuous formation therein of solid hydrate.

References Cited in the file of this patent

UNITED STATES PATENTS

| | | |
|---|---|---|
| 2,904,511 | Donath | Sept. 15, 1959 |
| 2,974,102 | Williams | Mar. 7, 1961 |

UNITED STATES PATENT OFFICE
CERTIFICATE OF CORRECTION

Patent No. 3,119,772 January 28, 1964

Martin Hess et al.

It is hereby certified that error appears in the above numbered patent requiring correction and that the said Letters Patent should read as corrected below.

Column 4, line 65, strike out "out of vessel 123. As a result, salt free water goes to" and insert the same after "flowing" in line 67, same column 4.

Signed and sealed this 1st day of June 1965.

(SEAL)
Attest:

ERNEST W. SWIDER
Attesting Officer

EDWARD J. BRENNER
Commissioner of Patents